United States Patent
Merrell et al.

(10) Patent No.: US 12,260,021 B1
(45) Date of Patent: Mar. 25, 2025

(54) PROVIDING USER FEEDBACK VIA A ROLLABLE SCREEN DEVICE

(71) Applicant: Motorola Mobility LLC, Chicago, IL (US)

(72) Inventors: Thomas Yates Merrell, St Charles, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/472,562

(22) Filed: Sep. 22, 2023

(51) Int. Cl.
  *G06F 3/01* (2006.01)
  *G06F 1/16* (2006.01)
  *H04M 1/02* (2006.01)

(52) U.S. Cl.
  CPC ............ *G06F 3/016* (2013.01); *G06F 1/1618* (2013.01); *H04M 1/0235* (2013.01); *H04M 1/0268* (2013.01)

(58) Field of Classification Search
  CPC .... G06F 3/016; G06F 1/1618; H04M 1/0235; H04M 1/0268
  See application file for complete search history.

(56) References Cited

U.S. PATENT DOCUMENTS

| | | | |
|---|---|---|---|
| 8,878,788 B2 | 11/2014 | Zurek et al. | |
| 11,838,433 B1 * | 12/2023 | Kumar Agrawal | H04M 1/0235 |
| 2001/0007449 A1 * | 7/2001 | Kobachi | G06F 3/0421 |
| | | | 345/156 |
| 2011/0254672 A1 * | 10/2011 | Ciesla | G06F 3/04886 |
| | | | 340/407.2 |
| 2014/0218330 A1 | 8/2014 | Ady | |
| 2014/0267139 A1 | 9/2014 | Slaby | |
| 2016/0103488 A1 * | 4/2016 | Levesque | G06F 1/1652 |
| | | | 345/156 |
| 2016/0202781 A1 | 7/2016 | Kim et al. | |
| 2019/0011988 A1 * | 1/2019 | Khoshkava | G06F 3/016 |
| 2019/0261519 A1 * | 8/2019 | Park | H05K 1/118 |
| 2022/0124188 A1 * | 4/2022 | Song | G06F 1/1652 |
| 2023/0017380 A1 * | 1/2023 | Kim | G06F 1/1652 |
| 2023/0280874 A1 * | 9/2023 | Han | G06F 3/0481 |
| | | | 715/781 |

OTHER PUBLICATIONS

"OPPO X 2021 Rollable Concept Handset, Unroll the Infinite", OPPO [retrieved Jul. 21, 2023]. Retrieved from the Internet <https://www.oppo.com/en/smartphones/oppo-x-2021/>., 31 Pages.

(Continued)

*Primary Examiner* — Ariel A Balaoing
(74) *Attorney, Agent, or Firm* — FIG. 1 Patents

(57) ABSTRACT

In aspects of providing user feedback via a rollable screen device, a mobile device has a housing and a screen moveable relative to the housing such that the mobile device has a compact form factor and an expanded form factor. The mobile device includes one or more sensors positioned relative to the screen for detecting user input including one or more forces applied to an expanded portion of the screen, where the expanded portion of the screen has extended from a compact portion of the screen. The mobile device implements a configuration manager configured to activate one or more components of the mobile device to indicate that the mobile device received the user input based on the one or more forces satisfying a threshold value.

20 Claims, 11 Drawing Sheets

(56) References Cited

OTHER PUBLICATIONS

Agrawal, Amit Kumar, et al., "Pursuant to MPEP § 2001.06(b) the applicant brings the following co-pending application to the Examiner's attention:", U.S. Appl. No. 18/364,341, filed Aug. 2, 2023, 39 pages.

Merrell, Thomas Yates, "Pursuant to MPEP § 2001.06(b) the applicant brings the following co-pending application to the Examiner's attention:", U.S. Appl. No. 18/472,577, filed Sep. 22, 2023, 46 pages.

Porter, Jon, "Oppo's rollable concept phone is pure potential lacking polish", Vox Media, LLC [retrieved Jul. 21, 2023]. Retrieved from the Internet <https://www.theverge.com/2021/6/16/22536363/oppo-x-2021-rollable-smartphone-demonstration-features>., Jun. 16, 2021, 29 Pages.

U.S. Appl. No. 18/472,577, "Non-Final Office Action", U.S. Appl. No. 18/472,577, filed Nov. 7, 2024, 9 pages.

\* cited by examiner

PROVIDING USER FEEDBACK VIA A ROLLABLE SCREEN DEVICE

BACKGROUND

Devices, such as smart devices, mobile devices (e.g., cellular phones, tablet devices, smartphones), consumer electronics, and the like, can be implemented for use in a wide range of environments and for a variety of different applications. Generally, mobile devices come in varying sizes and form factors, such as rectangular with an overall rigid shape, foldable devices with a housing that is hinged allowing a device to fold, and slidable devices with housing sections that slide apart and back together. Consumers typically want smaller devices that are convenient to carry, yet also prefer devices that have expandability for larger display viewing, such as with the foldable and slidable devices.

BRIEF DESCRIPTION OF THE DRAWINGS

Implementations of the techniques for providing user feedback via a rollable screen device are described with reference to the following Figures. The same numbers may be used throughout to reference like features and components shown in the Figures.

DETAILED DESCRIPTION

Figure 1:
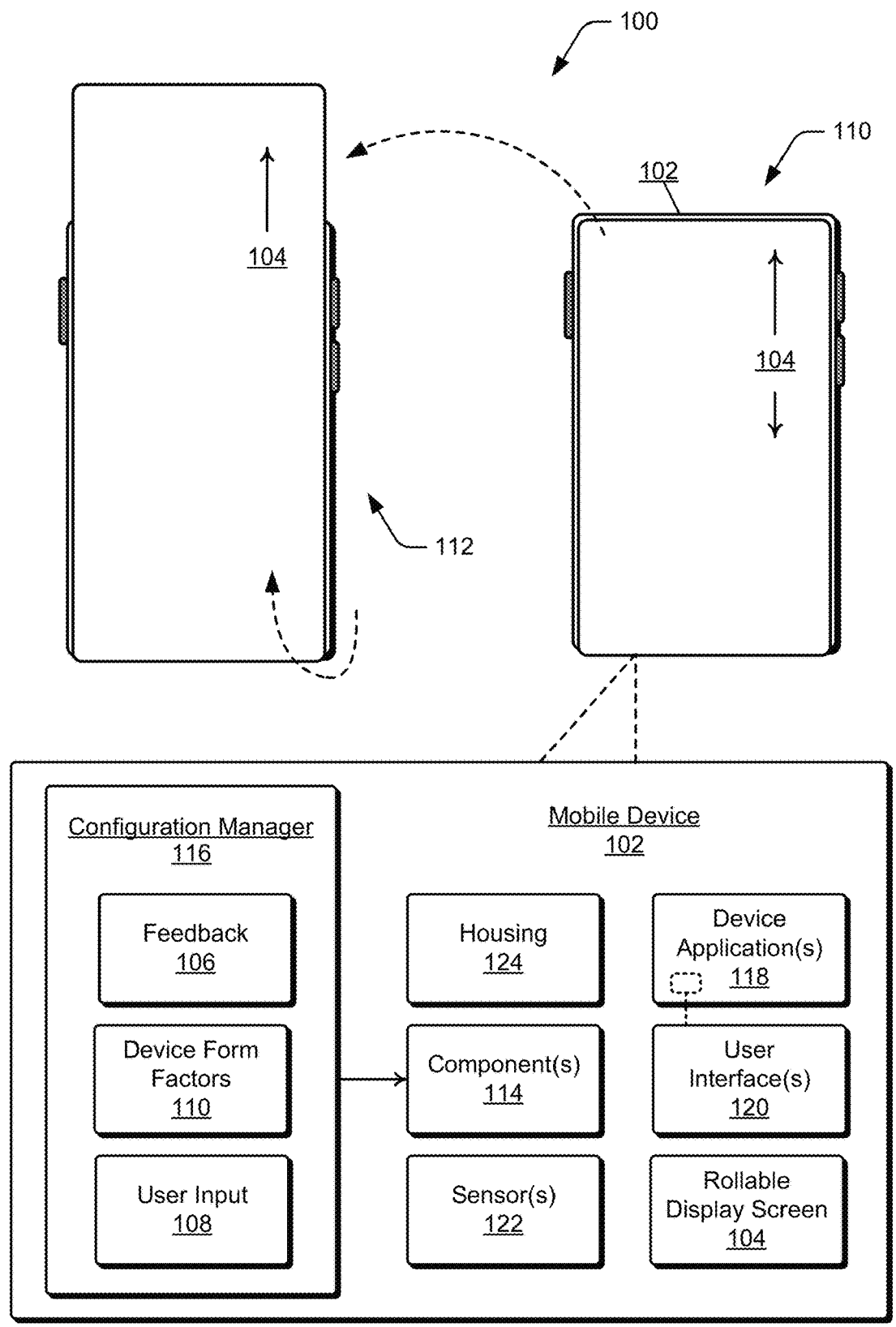
FIG. 1 illustrates an example system for providing user feedback via a rollable screen device in accordance with one or more implementations as described herein.

Implementations of techniques for providing user feedback via a rollable screen device are described herein, and the techniques apply to any device that is configurable in at least two form factors, such as any type of extendable device or foldable device (e.g., a flip-phone), either of which can change form factors automatically, or manually by a user of the device. For example, the form factor may be related to a size of the device, such that the form factors may include an expanded form factor and a compact form factor. A rollable screen device, such as a mobile device (e.g., any type of mobile phone, wireless device, and/or electronic device) is expandable with the rollable display screen that is configurable in one of multiple display states corresponding to respective device form factors. The rollable display screen may couple with one or more sensors that obtain or detect input from a user of the rollable screen device and components, such as actuators, and provide an output. Aspects of the techniques described in this disclosure leverage the expandable capability of devices, such as by receiving user inputs via the expanded portion of the device and providing corresponding feedback in response to the user input.

In some examples, a rollable screen device may expand to increase the surface area of a display to provide information to a user. The surface area of the screen before the rollable screen device expands may be referred to as a compact portion of the screen. The additional surface area of the screen added upon expansion of the rollable screen device may be referred to as the expanded portion of the screen. The action of the screen expanding and/or contracting, a graphical user interface (GUI) on the additional surface area, or the like may notify the user of information or may trigger the user to perform an action. For example, if the user is receiving a call, the rollable screen device may expand and display a message to the user indicating the incoming call. The rollable screen device may not interrupt the GUI on the compact portion of the screen and may instead use the expanded portion of the screen to display additional information. For example, if the user is using a mapping application on the rollable screen device for navigation instructions and concurrently receives an incoming call on the rollable screen device, the rollable screen device may expand, such that the navigation information is maintained on the compact portion of the screen and the call information is displayed to the user on the expanded portion of the screen.

In some cases, the user may acknowledge the information displayed on the expanded portion of the screen by applying pressure to the rollable portion of the rollable screen device. For example, the user may accept a call by applying upward pressure to the rollable screen portion of the rollable screen device. In some other examples, the user may decline a call by applying downward pressure to the rollable screen portion of the rollable screen device. However, the user may not know what force to apply to the rollable screen device. Additionally, or alternatively, there may be a delay between when the user applies the pressure and when the rollable screen device performs the action indicated by the pressure. Thus, the user may continue to apply additional pressure and/or may apply too much pressure, which may damage the rollable screen device, may indicate an action that the user did not intend, or both.

As described herein, the rollable screen device can provide feedback to the user indicating that the rollable screen device received the user input. The user may apply a force to a side, corner, and/or edge of the expanded portion of the rollable screen device, and the rollable screen device can then provide tactile feedback, visual feedback, and/or audio feedback to the user in response. In some cases, the rollable screen device may activate one or more components (e.g., actuators, piezoelectric sensors, or any other component) to indicate the feedback. The rollable screen device may move the screen through a series of motions to indicate information to the user. For example, the rollable screen device may move the screen down slightly and then may return the screen to the initial expanded position to mimic a button press. In some other examples, the rollable screen device may activate, or drive, two actuators to create a wiggle effect (e.g., by concurrently or simultaneously driving the actuators in different directions).

While features and concepts of the described techniques for providing user feedback via a rollable screen device can be implemented in any number of different devices, systems, environments, and/or configurations, implementations of the techniques for providing user feedback via a rollable screen device are described in the context of the following example devices, systems, and methods.

FIG. 1 illustrates an example system 100 for providing user feedback via a rollable screen device, as described herein. The example system 100 includes a mobile device 102, such as a smartphone, mobile phone, wireless device, and/or any other type of wireless device. The mobile device 102 can be implemented with various components, such as a processor system and memory, as well as any number and combination of different components as further described with reference to the example device shown in FIG. 12. In implementations, the mobile device 102 includes various radios for wireless communication with other devices. For example, the mobile device 102 may include a Bluetooth (BT) and/or Bluetooth Low Energy (BLE) transceiver and/or a near field communication (NFC) transceiver. The mobile device 102 may also include a Wi-Fi radio, a GPS radio, and/or any type of device communication interfaces.

The mobile device 102 has a rollable display screen 104 that can be configured in any one of various positions to provide feedback 106 in response to user input 108. The various positions of the rollable display screen 104 may be referred to as display states and may correspond to respective form factors 110 of the mobile device 102. For example, the device form factors 110 can include a compact form factor, an expanded form factor, a partial form factor (also referred to as a "peek" form factor), as well as other device form factors. The rollable display screen 104 may be positioned in any incremental display state, or screen position, corresponding to device form factors between the compact form factor and the expanded form factor. In this example system 100, the mobile device 102 is shown in the compact form factor at 110, with the rollable display screen 104 configured in a retracted display state that corresponds to the compact form factor of the device. Further, the mobile device 102 is shown in the expanded form factor at 112, with the rollable display screen 104 configured in an extended display state. The rollable display screen 104 is a flexible display that translates between the retracted display state to the extended display state, and back. In one or more implementations, the rollable display screen 104 is an organic light emitting diode (OLED) display fabricated on a flexible plastic substrate, which allows the flexible display to deform around the device housing.

The mobile device 102 includes one or more components 114, which may include features of a slidable display mount. The slidable display mount may be a powered sliding or translation mechanism (e.g., one or more actuators, motor, gear assembly, drive screws, etc.) operable to transition the rollable display screen 104 around the surfaces of the device housing, such as between the extended display state where the rollable display screen 104 extends distally from the device housing, and the retracted display state where the rollable display screen 104 corresponds to the compact form factor of the device with the flexible display wrapping around the surfaces of the device housing. In one or more implementations, the rollable display screen 104 may be extended or retracted automatically, such as based on whether content is being displayed on the display screen for viewing, a size of the displayed content, and/or based on the type of displayed content. For example, a user may prefer the mobile device 102 in the compact form factor as shown at 110 for ease of carrying, and then when initiating to playback content for viewing, the rollable display screen 104 automatically extends from the retracted display state to the extended display state for full-screen viewing, as shown at 112 in the expanded form factor of the device.

The mobile device 102 includes various functionality that enables the mobile device 102 to implement different aspects of providing user feedback via a rollable screen device, as described herein. In this example system 100, the mobile device 102 includes a configuration manager 116 that represents functionality (e.g., logic, software, and/or hardware) enabling the automatic function control of the slidable display mount for translating and positioning the rollable display screen 104. The configuration manager 116 can be implemented as computer instructions stored on computer-readable storage media (e.g., memory of the device), or in any other suitable memory device or electronic data storage and can be executed by a processor system of the device. Alternatively, or in addition, the configuration manager 116 can be implemented at least partially in firmware and/or at least partially in computer hardware. For example, at least part of the configuration manager 116 may be executable by a computer processor, and/or at least part of the configuration manager may be implemented in logic circuitry. In one or more implementations, the configuration manager 116 may include independent processing, memory, and/or logic components functioning as a computing and/or electronic device integrated with the mobile device 102.

In aspects of providing feedback 106 to a user via a mobile device 102, the mobile device 102 implements the configuration manager 116 as any type of control unit that can initiate activating the components 114 of the mobile device 102 to provide the feedback 106 to the user based on detecting one or more forces applied to the expanded portion of the rollable display screen 104 of the mobile device 102. As noted, the techniques described herein apply to any device that is configurable in at least two device form factors 110.

The mobile device 102 can include and implement various device applications 118, such as any type of messaging application, email application, video communication application, cellular communication application, music application, gaming application, media application, social platform applications, and/or any other of the many possible types of device applications. Many of the device applications 118 have an associated application user interface 120 that is generated and displayed for user interaction and viewing, such as on the rollable display screen 104 of the mobile device 102. Generally, an application user interface, or any other type of video, image, graphic, and the like is digital image content that is displayable on the rollable display screen 104 of the mobile device. In this example system 100, the configuration manager 116 can be implemented as a software application or module, such as executable software instructions that are executable with a processor system of the mobile device 102 to implement the techniques and features described herein. As a device application, the configuration manager 116 may have an associated application user interface 120 that is generated and displayable for user interaction and viewing, such as on the rollable display screen 104 of the mobile device.

The rollable display screen 104 can be utilized to display any of various types of content on the mobile device 102. In one or more implementations, the mobile device 102 generates and/or outputs content from a device application 118 and/or operating system of the device, and the content is displayed on the rollable display screen 104. For example, a media application may receive streaming content from a remote server via a communication network for display on the rollable display screen.

Any of the devices, applications, modules, servers, and/or services described herein can communicate via a communication network, such as for data communication between the mobile device 102 and other communication and/or computing devices. The communication network can be implemented to include a wired and/or a wireless network, may be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, mobile phone provider, and/or Internet service provider.

In this example system 100, the mobile device 102 also includes one or more sensors 122. In some implementations, the sensors 122 measure force and may be examples of strain gauges, load cells, piezoelectric sensors, or any other type of sensor that measures applied force. The sensors 122 can be positioned within a housing 124 of the mobile device 102 to measure force applied to the rollable display screen 104 of the mobile device 102 in the expanded form factor. In some cases, the sensors 122 may be positioned within the slidable display mount. In one or more implementations, the configuration manager 116 may receive an indication of one or more forces applied to a side, corner, and/or edge of the rollable display screen 104 of the mobile device 102 from the sensors 122, and the one or more forces indicate the user input 108. For example, the sensors 122 may be positioned at a same location as one or more actuators configured to transition the mobile device 102 from a compact form factor to an expanded form factor. If a user applies a force that counteracts the transition, such as in a direction opposite the direction the screen is moving when expanding, the sensors 122 can detect and measure the force.

In one or more implementations, the mobile device 102 includes a battery or any other type of similar power source to power features of the mobile device, including the slidable display mount that is the powered sliding or translation mechanism operable to transition the rollable display screen 104 around the surfaces of the device housing. In one or more implementations, the configuration manager 116 can receive an indication of battery power, such as an indication of battery usage of the battery, remaining battery power of the battery, an indication of low battery power, and/or whether the device is plugged into an external power source and the battery is charging.

In one or more implementations, the mobile device 102 may also be configured in other device form factors 110, such as a partial form factor, which is further shown and described with reference to FIG. 2. As noted above, the partial form factor may also be referred to as a "peek" form factor, and in this configuration, the rollable display screen 104 translates down (e.g., in an opposite direction of the extended display state). This display state provides for an unobstructed sensory view of various device sensors and/or components that are otherwise hidden behind the rollable display screen 104 in both the compact form factor (retracted display state) and expanded form factor (extended display state). For example, sensors such as a front-facing camera, environment sensors (for motion, sound, lighting, etc.), a proximity sensor, and/or a phone earpiece speaker can all be integrated in the mobile device 102 under the rollable display screen 104, and the slidable display mount translates the display screen over or above the sensors. These under-the-display screen sensors are then exposed or visible for use in the sensor display state of the rollable display screen 104, which corresponds to the partial form factor of the mobile device 102.

In implementations, the configuration manager 116 can initiate to configure the mobile device 102 in the partial form factor corresponding to the sensor display state of the rollable display screen 104 when an incoming voice call will require user access to the phone earpiece speaker, or when the front-facing camera is needed for image capture. Although generally described throughout this disclosure as the configuration manager 116 initiating and/or automatically controlling the configuration and/or reconfiguration of the form factors 110 of the mobile device 102, a user of the device may initiate to configure the device in any form factor and/or display state of the rollable display screen, and override configuration settings of the configuration manager.

In one or more implementations, a portion of the rollable display screen 104 rotates around the housing of the mobile device 102, such as in the compact form factor of the device, forming a rear-facing portion of the display screen (e.g., relative to the front-facing portion of the display screen shown in the compact form factor at 110 and in the expanded form factor at 112 in the example system 100). In implementations, both the front-facing portion and the rear-facing portion of the rollable display screen 104 can be used to display content, such as related content or content associated with two different applications. In the expanded form factor of the mobile device 102, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

In one or more implementations of the techniques described herein for providing feedback 106 to a user, the configuration manager 116 may activate the one or more components 114 of the mobile device 102 to notify a user that user input 108 is received. The mobile device 102 may expand from the compact form factor at 110 to the expanded form factor at 112 to provide information to the user. The expanding may increase a surface area of a rollable display screen 104. The mobile device 102 may display information to the user, and the user may respond to the information. For example, the displayed information may be a notification of a message from another user, a system status of the mobile device 102, a system status of another device connected to the mobile device 102, or any other notification. The user may have multiple options to respond to the notification, such as by acknowledging the notification, denying the notification, accepting the notification, preparing a message in response to the notification, or the like. The user may apply a force to a side, corner, and/or edge of the expanded portion of the rollable display screen 104 of the mobile device 102 in the expanded form factor at 112 to provide user input 108, which is further shown and described with reference to FIG. 5.

The configuration manager 116 may determine whether the user input 108 is sufficient to respond to the notification and can provide feedback 106 to the user accordingly. The feedback may include activation of the one or more components 114 of the mobile device 102. For example, the mobile device 102 may activate one or more actuators to mimic a button press, a wiggle effect, and/or move the screen through a series of movements to communicate feedback to a user.

Figure 2:
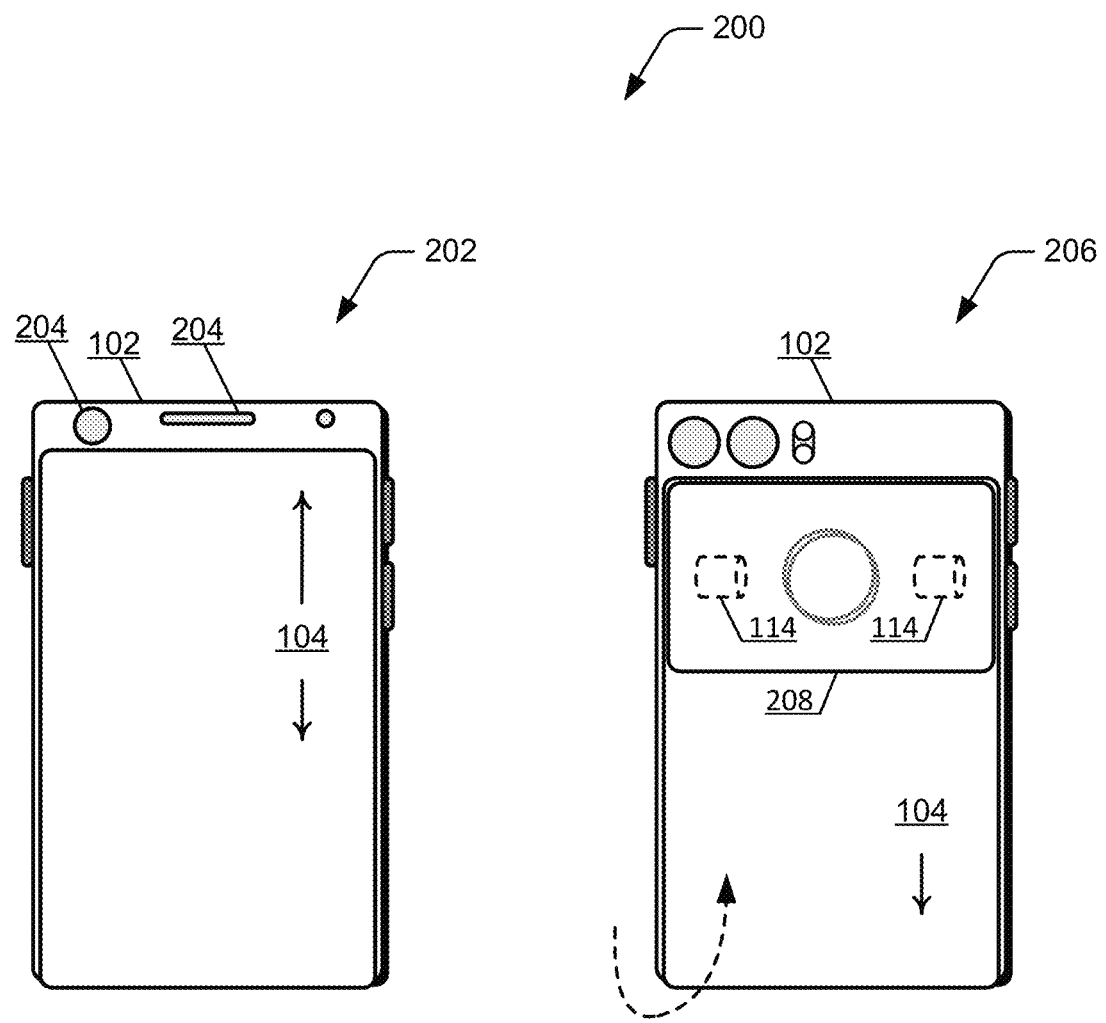
FIGS. 2 through 4 further illustrate example views of a mobile device, which supports providing user feedback via a rollable screen device in accordance with one or more implementations as described herein.

FIG. 2 further illustrates example views 200 of a mobile device 102 in aspects of providing user feedback via a rollable screen device, as described herein. The example views 200 may implement aspects of the example system 100. For example, the example views 200 illustrate an example of a mobile device 102 with a rollable display screen 104 and one or more components 114, which are examples of the corresponding features as described with reference to FIG. 1.

In the example views 200, the mobile device 102 is shown in a front view 202 in the partial form factor (e.g., also referred to as the "peek" form factor), with the rollable display screen 104 configured in the sensor display state. In this configuration, the rollable display screen 104 translates down (e.g., in an opposite direction of the extended display state). This sensor display state provides for an unobstructed sensory view of various device sensors 204 and/or components that are otherwise hidden behind the rollable display screen 104 in both the compact form factor (retracted display state) and expanded form factor (extended display state).

For example, the device sensors 204, such as a front-facing camera, environment sensors (e.g., for motion, sound, lighting, etc.), a proximity sensor, and/or phone earpiece speaker can all be integrated in the mobile device 102 under the rollable display screen 104, and the slidable display mount 208 translates the display screen over or above the sensors. These under-the-display screen sensors are then exposed or visible for use in the sensor display state of the rollable display screen 104 that corresponds to the partial form factor of the mobile device 102. In these example views 200, the mobile device 102 is also shown in a back view 206 in the partial form factor of the device, with the rollable display screen 104 configured in the sensor display state. The rollable display screen 104 is translated by the slidable display mount 208 around the device housing and forms the rear-facing portion of the display screen.

In some examples, the slidable display mount 208 may include one or more components 114, such as actuators, piezoelectric sensors, or any other component. The components 114 provide feedback (e.g., the feedback 106 as described with reference to FIG. 1) to a user if force measurements related to user input are above or are below a threshold value. For example, the mobile device 102 may activate the components 114 to move the rollable display screen 104 in a series of directions, according to a series of displacements, or both to provide feedback to the user. Additionally, or alternatively, the components 114 may include sound emitters that provide audio feedback, may use voltage differentials (e.g., from piezoelectric sensors) to provide the feedback, and/or may provide visual feedback by moving the rollable display screen 104 or displaying information on a GUI of the rollable display screen 104. In some examples, the piezoelectric sensors may measure the force applied to a side, corner, and/or edge of the rollable display screen 104 of the mobile device 102 related to the user input and may actuate the rollable display screen 104 using voltage differentials. Although the components 114 are illustrated as being in a same location as the slidable display mount 208, the components 114 may be located anywhere on or in the mobile device 102. For example, the components 114 may be part of a motor assembly in the slidable display mount 208, may be located at the base of the slidable display mount 208, or the like. Different types of sensors may be located at different locations of the mobile device 102 in accordance with functionality of the sensors. For example, force sensors may be located at one or more actuators of the slidable display mount 208, such that when a resistive force is applied to the rollable display screen 104, the force sensors measure the force against the actuators.

Figure 3:
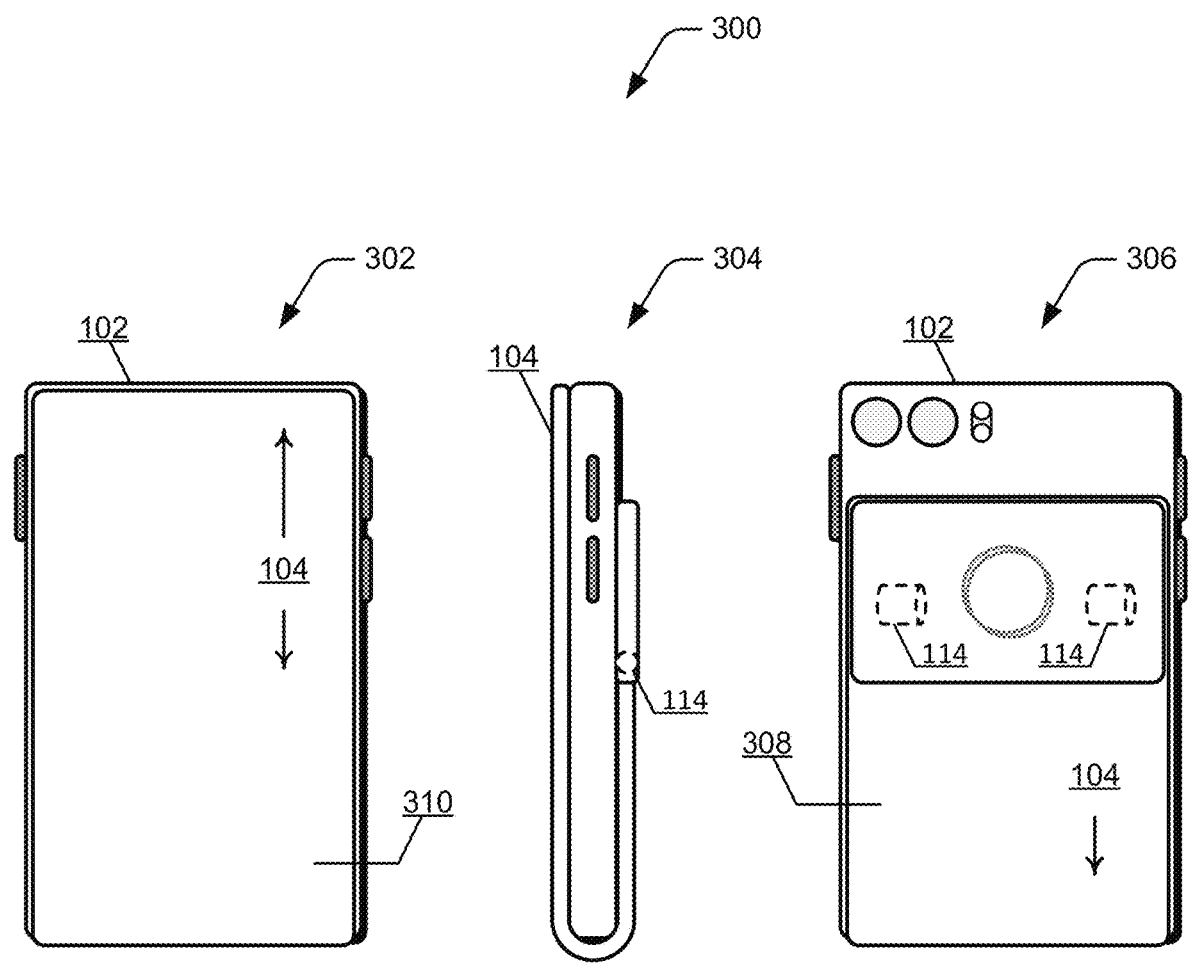

FIG. 3 further illustrates example views 300 of a mobile device 102 in aspects of providing user feedback via a rollable screen device, as described herein. The example views 300 may implement aspects of the example system 100, as well as the example views 200 described with reference to FIGS. 1 and 2. For example, the example views 300 illustrate an example of the mobile device 102 with the rollable display screen 104 and one or more components 114, which are examples of corresponding features as described with reference to FIGS. 1 and 2.

In these example views 300, the mobile device 102 is shown in a front view 302, a side view 304, and a back view 306 in the compact form factor, with the rollable display screen 104 configured in the retracted display state. In this configuration, a portion of the rollable display screen 104 rotates around the housing of the mobile device 102, forming a rear-facing portion 308 of the display screen (e.g., relative to the front-facing portion 310 of the display screen). In implementations, both the front-facing portion 310 and the rear-facing portion 308 of the rollable display screen 104 can be used to display content, such as related content or content associated with different applications.

In some examples, the rollable screen device may include one or more components 114, which are examples of the components 114 as described with reference to FIGS. 1 and 2. For example, the rollable screen device may activate the components 114 to provide tactile, visual, and/or audio feedback to a user upon receiving user input.

Figure 4:
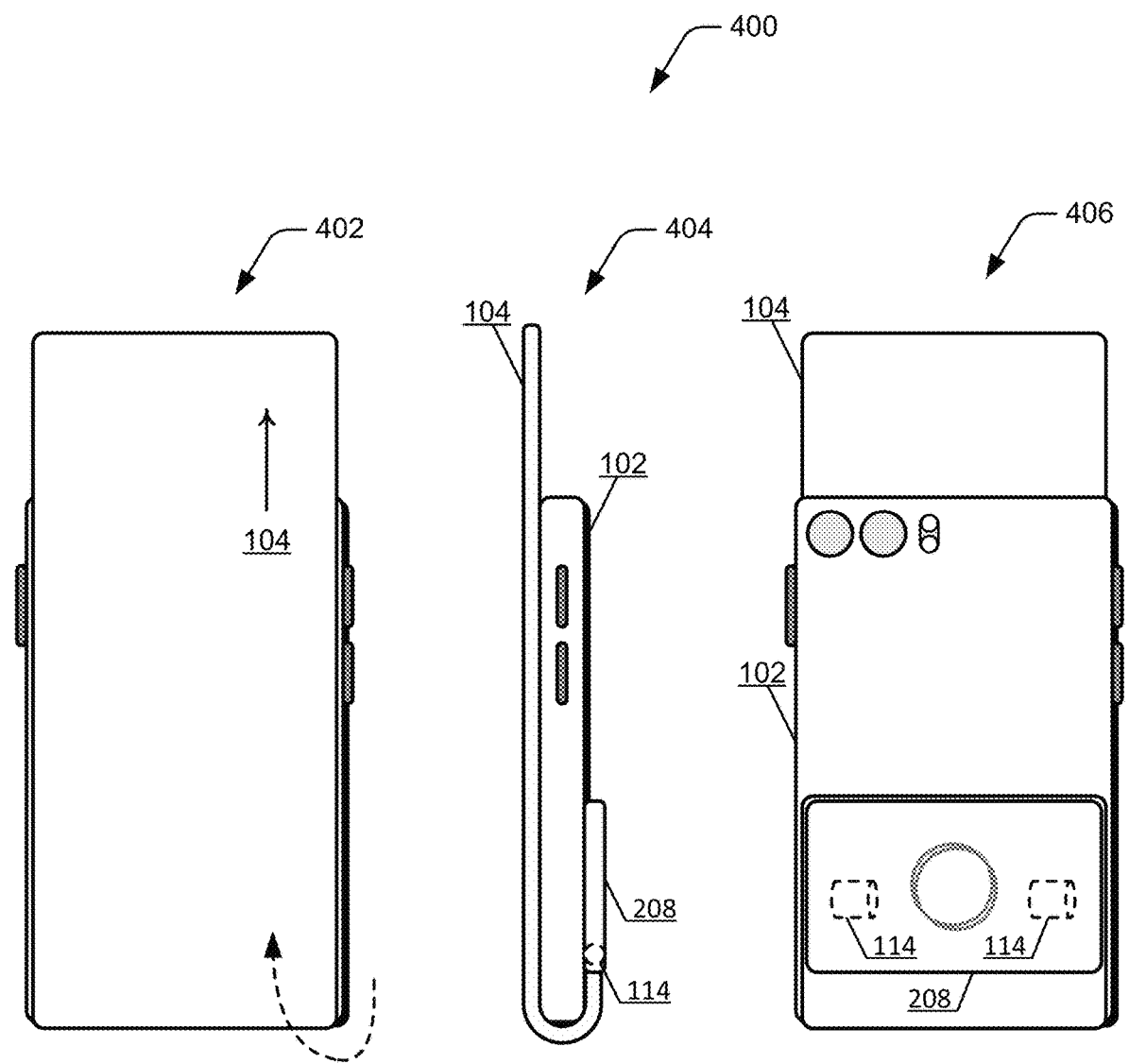

FIG. 4 further illustrates example views 400 of a mobile device 102 in aspects of providing user feedback via a rollable screen device, as described herein. The example views 400 may implement aspects of the example system 100, as well as any of the example views 200 and 300 described with reference to FIGS. 1 through 3. For example, the example views 400 illustrate an example of the mobile device 102 with the rollable display screen 104, one or more components 114, and a slidable display mount 208, which are examples of corresponding features as described with reference to FIGS. 1 through 3.

In these example views 400, the mobile device 102 is shown in a front view 402, a side view 404, and a back view 406 in the expanded form factor, with the rollable display screen 104 configured in the extended display state. In this configuration, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

As illustrated in the figures, a slidable display mount 208 translates the rollable display screen 104 around the device housing to change the overall length of the flexible display as viewed from the front of the mobile device 102 (e.g., as shown in the front view 402). The slidable display mount 208 also translates the rollable display screen 104 in an opposite direction around the device housing to the retracted display state in the compact form factor of the device, and more of the rollable display screen 104 is viewable as the rear-facing portion of the display. Content, such as any type of graphics and images, can be displayed on any section of the rollable display screen 104, including on the front-facing portion, on the rear-facing portion, and/or on the curved end portion of the display screen. Thus, the screen may be considered moveable relative to a housing of the mobile device 102 (e.g., the slidable display mount 208).

In some examples, the rollable screen device may include one or more components 114, are examples of the components 114 as described with reference to FIGS. 1 and 2. For example, the rollable screen device may activate the components 114 to provide tactile, visual, and/or audio feedback to a user upon receiving user input while the rollable screen device is in the extended display state.

Figure 5:
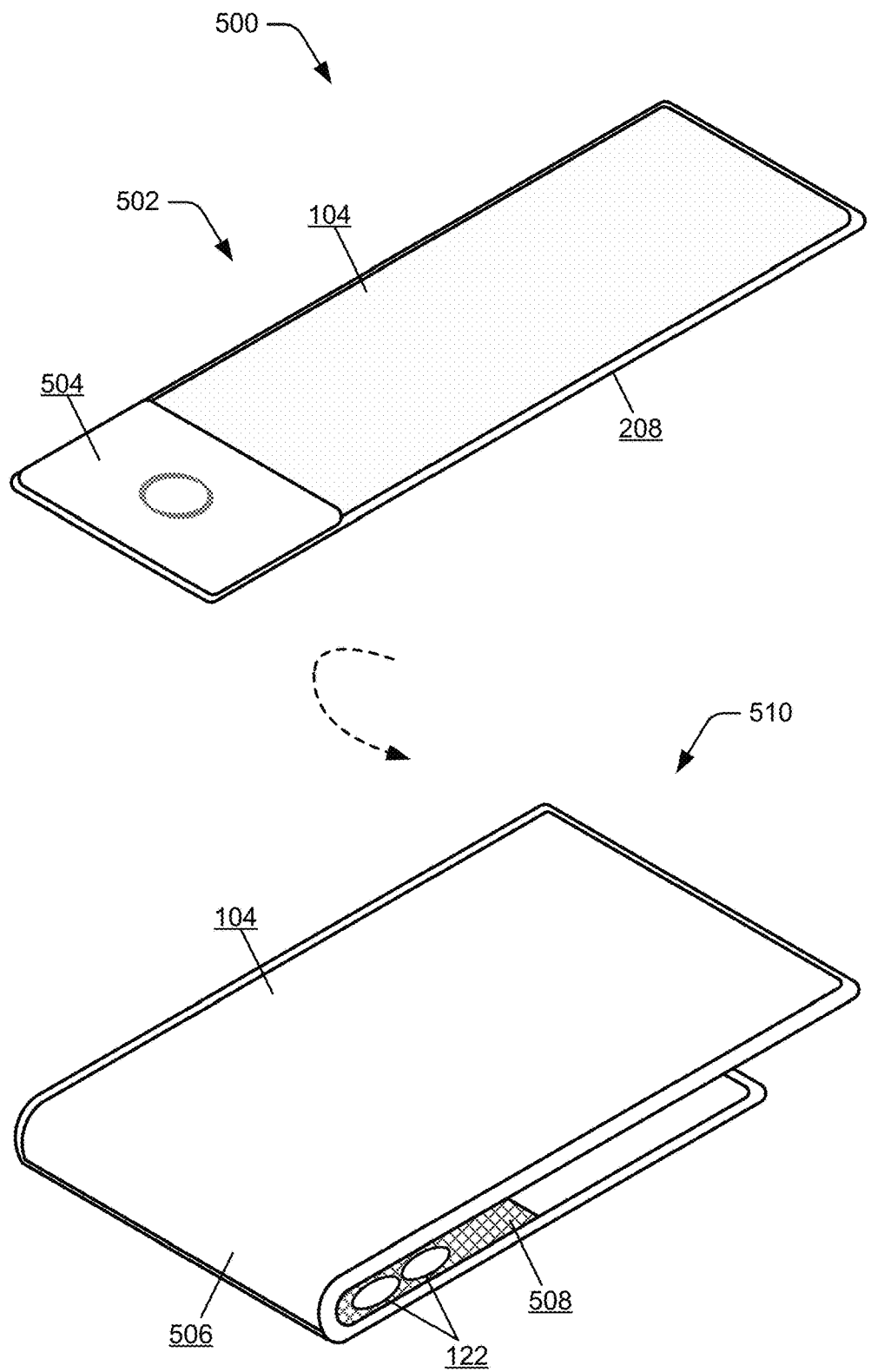
FIG. 5 further illustrates an example view of user input to a mobile device, which supports providing user feedback via a rollable screen device in accordance with one or more implementations as described herein.

FIG. 5 illustrates example views 500 of the rollable display screen and the slidable display mount of a mobile device 102 in aspects of providing user feedback via a rollable screen device, as described herein. The example views 500 may implement aspects of the example system 100, as well as any of the example views 200, 300, and 400 described with reference to FIGS. 1 through 4. For example, the example views 500 illustrate an example of the mobile device 102 with the rollable display screen 104, one or more sensors 122, and a slidable display mount 208, which are examples of corresponding features as described with reference to FIGS. 1 through 4.

In the example views 500, the rollable display screen 104 integrated with the slidable display mount 208 is shown configured at 502, along with a backplate 504. A display roller mechanism can be implemented to facilitate the flexible display and mounting assembly (e.g., the rollable display screen 104 and a slidable display mount 208) wrapping around the device housing. The display roller mechanism includes a rotor positioned within the curvilinear section 506 of the flexible display and mounting assembly to facilitate translation of the rollable display screen 104 in the various display states. In one or more implementations, the slidable display mount 208 includes a substrate that includes a flexible portion 508, which allows the flexible display and mounting assembly to wrap and deform around the device housing. As shown at 510, the rollable display screen 104 and the slidable display mount 208 are wrapped around to form the curvilinear section 506 of the flexible display, along with two linear sections of the display as the front-facing portion and the rear-facing portion of the rollable display screen. As shown in the example views 500, a cross section of the rollable display screen 104 and the slidable display mount 208 forms a J-shape or U-shape with the curvilinear section 506 of the display.

In some examples, the rollable screen device may activate the roller mechanism (e.g., by driving one or more actuators) to provide feedback to a user upon receiving user input. The rollable screen device may receive user input via one or more sensor measurements from the sensors 122. For example, the sensors 122 may sense, or determine, physical parameters indicative of conditions of the rollable screen device environment. The sensors 122 may include force sensors, motion sensors, or both. Although the example views 500 illustrate two sensors 122, the mobile device 102 may include any numerical quantity of sensors 122. Further, the sensors 122 may be located at any position on or within the mobile device 102.

Figure 6:
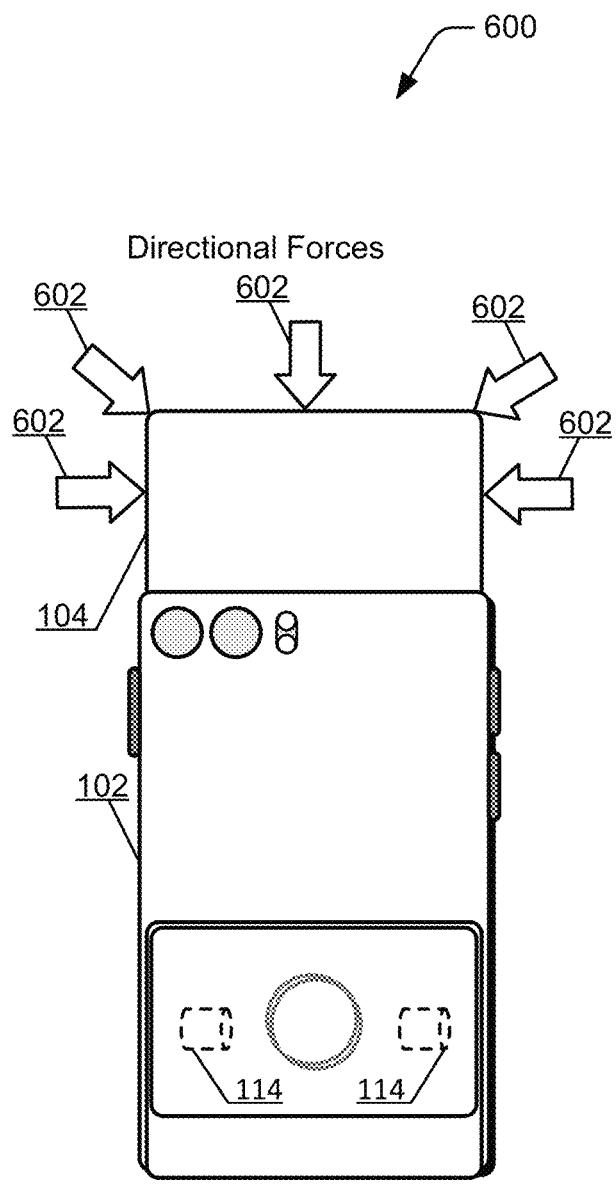
FIGS. 6 and 7 illustrate example views of rollable display screen movement, which supports providing user feedback via a rollable screen device in accordance with one or more implementations as described herein.

FIG. 6 further illustrates an example 600 of a mobile device 102 in aspects of providing user feedback via a rollable screen device, as described herein. The example 600 may implement aspects of the example system 100, as well as any of the example views 200, 300, 400, and 500 described with reference to FIGS. 1 through 5. For example, the example 600 may illustrate an example of the mobile device 102 with the rollable display screen 104 and components 114, which are examples of the corresponding features as described with reference to FIGS. 1 through 4.

In this example 600, the mobile device 102 is generally shown in an expanded form factor. Notably the techniques described herein apply to any device that is configurable in at least two form factors, such as any type of extendable device or foldable device (e.g., a flip-phone), either of which can change form factors automatically, or manually by a user of the device. In this example 600, the mobile device 102 includes components 114 that the mobile device 102 may activate to provide feedback to a user of the mobile device 102. Although only two components 114 are shown and described in the mobile device 102 in this example 600, many electronic and/or computing devices include more than two components that provide feedback to a user.

In this example 600, the mobile device 102 may expand to increase the surface area of the rollable display screen 104 to provide information to a user. The difference in surface area of the rollable display screen 104 between the compact form factor and the expanded form factor may be referred to as the expanded portion of the rollable display screen 104. In some examples, the action of the rollable display screen 104 expanding and/or contracting may prompt the user to provide input. In some other examples, the GUI of the expanded portion of the rollable display screen 104 can display a prompt to the user to provide input. For example, the rollable display screen 104 may perform a defined set of movements to indicate for the user to provide input. Additionally, or alternatively, the rollable display screen 104 may display an incoming notification to the user (a phone call, an incoming message, a system notification, an application notification, etc.), and the user may provide input to indicate to the mobile device 102 to perform an action related to the notification. That is, if the notification is an incoming call, the mobile device 102 may display the incoming call information (e.g., contact information for the incoming caller and a message notifying the user of the call). The user may accept the call, decline the call, prepare a message, or perform any other action in response to the incoming call information.

The mobile device 102 can include one or more sensors, such as sensors 122 as described with reference to FIGS. 1 and 5, to detect user input. For example, the sensors measure force magnitude and direction, acceleration, or any other type of resistance. The configuration manager 116 implemented by the mobile device 102 can compare the measurements from the sensors to a criterion, such as one or more threshold values, to determine whether the user is providing input. The criteria can be preconfigured at the mobile device 102, can be determined by a calibration procedure, or can be otherwise defined.

In some cases, the user may provide the input by applying one or more directional forces 602 to a side, corner, or edge of the expanded portion of the rollable display screen 104. For example, the user may accept a call by applying a single directional force (e.g., any one of the directional forces 602) to a side, corner, or edge of the expanded portion of the rollable display screen 104. In some other examples, the user may decline a call by applying multiple directional forces, such as two of the directional forces 602, to a side, corner, or edge of the expanded portion of the rollable display screen 104. That is, the user may tap twice or more on the expanded portion of the rollable display screen 104 to indicate to the configuration manager 116 of the mobile device 102 to decline the incoming call. In some implementations, the numerical quantity of the directional forces 602 applied, the combination of the directional forces applied, and/or the duration of the forces applied can indicate to the configuration manager 116 to perform an action (e.g., one tap, long press, short press, or double tap may each indicate a different software action).

Additionally, or alternatively, the user may indicate that the mobile device 102 perform an action according to different ones of the directional forces 602. For example, the user may indicate to the configuration manager 116 of the mobile device 102 to accept an incoming call by applying one of the directional forces 602, and alternatively, decline the incoming call by applying a different one of the directional forces 602, or any combination of different forces. Additionally, or alternatively, the user may indicate to the configuration manager 116 of the mobile device 102 to perform an action according to a magnitude of a directional force applied. For example, the user may indicate for the mobile device 102 to accept an incoming call by applying one of the directional forces 602 at a first magnitude, and alternatively, decline the incoming call by applying the directional force 602 at a second, different magnitude. Thus, a direction, magnitude, and/or location of a directional force applied to a side, corner, or edge of the extended portion of the rollable display screen 104 triggers a software action at the mobile device 102.

In some cases, the user may not know the magnitude of a directional force 602 to apply to a side, corner, or edge of the expanded portion of the rollable display screen 104. Additionally, or alternatively, there may be a delay between when the user applies the directional force 602 and when the mobile device 102 reacts and performs the action indicated by the location, magnitude, and/or direction of the directional force. Thus, the user may continue to apply additional pressure and/or may apply too much pressure, which can damage the rollable display screen 104 of the mobile device 102, can indicate an action that the user did not intend, or both. To prevent damage and/or performing incorrect actions, the mobile device 102 can provide feedback to the user to indicate that the mobile device 102 received the user input.

In some examples, the feedback includes audio feedback, visual feedback, tactile feedback, or any other type of feedback. The mobile device 102 includes components 114 for providing the feedback. For example, the mobile device 102 can include a sound emitter to provide audio feedback, actuators and/or piezoelectric sensors to provide tactile feedback, and the GUI to display visual feedback. The ability of the mobile device 102 to physically change shape can enable the mobile device 102 to provide tactile feedback to the user in addition to using a linear or rotary vibrator, which can have a relatively reduced range of motion when compared with the actuators controlling the rollable display screen 104.

In some examples, the mobile device 102 can move the expanded portion of the rollable display screen 104 through a series of movements to provide the feedback to the user. For example, the mobile device 102 can move the rollable display screen 104 up or down slightly to simulate, or emulate, a button press, which is described in further detail with respect to FIG. 7. In some other examples, the mobile device 102 can move the rollable display screen 104 to rotate the screen, which may be referred to as a wiggle effect, and which is described in further detail with respect to FIG. 8.

Figure 7:
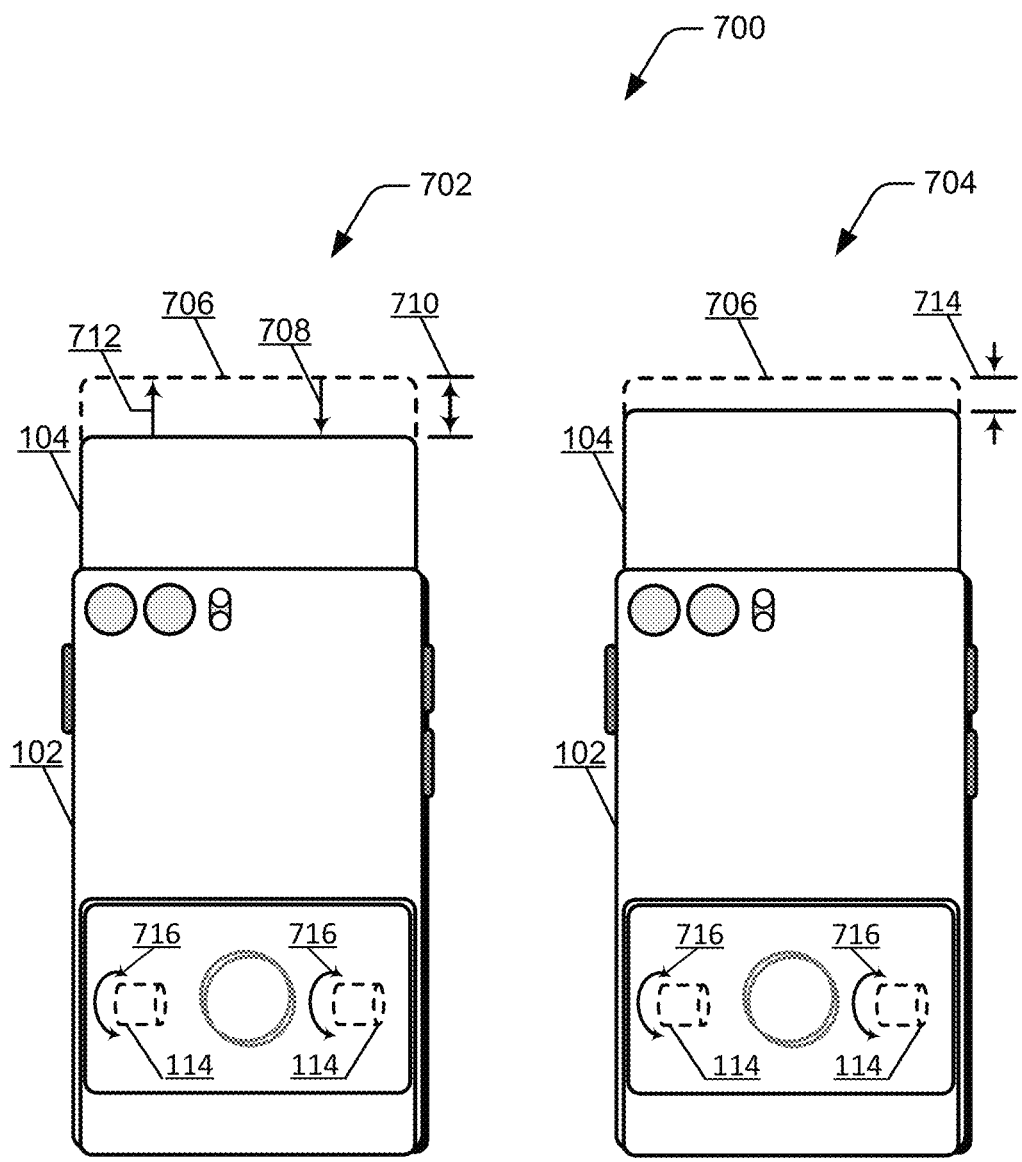

FIG. 7 further illustrates example views 700 of a mobile device 102 in aspects of providing user feedback via a rollable screen device, as described herein. The example views 700 may implement aspects of the example system 100, as well as any of the example views 200, 300, 400, 500, and 600 as described with reference to FIGS. 1 through 6. For example, the example views 700 may illustrate an example of the mobile device 102 with the rollable display screen 104 and components 114, which are examples of the corresponding features as described with reference to FIGS. 1 through 6.

In the example views 700, the mobile device 102 can move an expanded portion of the rollable display screen 104 through a series of positions to provide feedback to a user, including a position 702 and a position 704. The mobile device 102 may receive a user input and select a series of movements in accordance with the user input. For example, if the user does not apply enough force to satisfy a threshold value, the mobile device 102 selects a set of movements to indicate to the user to apply more force. In some other examples, if the user applies a sufficient force to satisfy a threshold value, the mobile device 102 can select a set of movements to indicate to the user that the user input is received. In some other examples, if the user applies sufficient force to satisfy a threshold value related to damaging the mobile device 102 (e.g., relatively too much force), the mobile device 102 can select a set of movements to indicate to the user that the user input is received and to reduce the force applied. In addition to, or as an alternative to, selecting a set of movements, the mobile device 102 can select visual, audio, and/or tactile feedback to indicate to the user to apply more force, the user input is received, and/or the force is too high.

In the example position 702, the rollable display screen 104 can be moved from an expanded state 706 in a downward direction 708 (e.g., a direction opposite to the direction of expansion of the rollable display screen 104) to a displacement 710. Additionally, or alternatively, the rollable display screen 104 can be moved from the displacement 710 in an upward direction 712 (e.g., a direction that is the same as the direction of expansion of the rollable display screen 104) to the expanded state 706. In the example position 704, the rollable display screen 104 can be moved from the expanded state 706 in a downward direction 708 to a displacement 714. Additionally, or alternatively, the rollable display screen 104 can be moved from the displacement 714 in an upward direction 712 to the expanded state 706.

The mobile device 102 can activate the components 114 to achieve the movement. For example, the mobile device 102 can activate, or drive, two actuators in a same rotational direction 716 to move the rollable display screen 104, where the rotational direction 716 is a right rotational direction to move the screen in a downward direction 708 or a left rotational direction to move the screen in an upward direction 712. In some examples, the mobile device 102 selects a relatively greater displacement, such as the displacement 710, to indicate to the user different feedback than the relatively smaller displacement, such as the displacement 714. If the user does not apply sufficient force or applies too much force (e.g., a force fails to satisfy a threshold), the configuration manager 116 of the mobile device 102 moves the rollable display screen 104 to the displacement 710 in the position 702. If the user does apply sufficient force, the configuration manager 116 of the mobile device 102 moves the rollable display screen 104 to the displacement 714 in the position 704. In some examples, a respective magnitude of each displacement (e.g., a magnitude of the displacement 714 and the displacement 710), a numerical quantity of the one or more displacements, or both indicate instructions to the user of the mobile device 102. The instructions can include for the user to perform an action, such as to repeat the forces for the user input, to reduce a magnitude of the forces of the user input, or the like. Additionally, or alternatively, the instructions can indicate a notification or message to the user, such as a notification that the user input is received, that the mobile device 102 is processing the user input, or any other notification or message related to the user input.

In some examples, the configuration manager 116 of the mobile device 102 can initiate a movement of the rollable display screen 104 to the displacement 710 or the displacement 714 and then return the position of the rollable display screen 104 to the expanded state 706. The mobile device 102 can respond and perform the movements quickly to simulate a button press. In some other examples, the mobile device 102 can use one or more other components to simulate a button press, such as a piezoelectric sensor, or any other type of sensor feedback.

Figure 8:
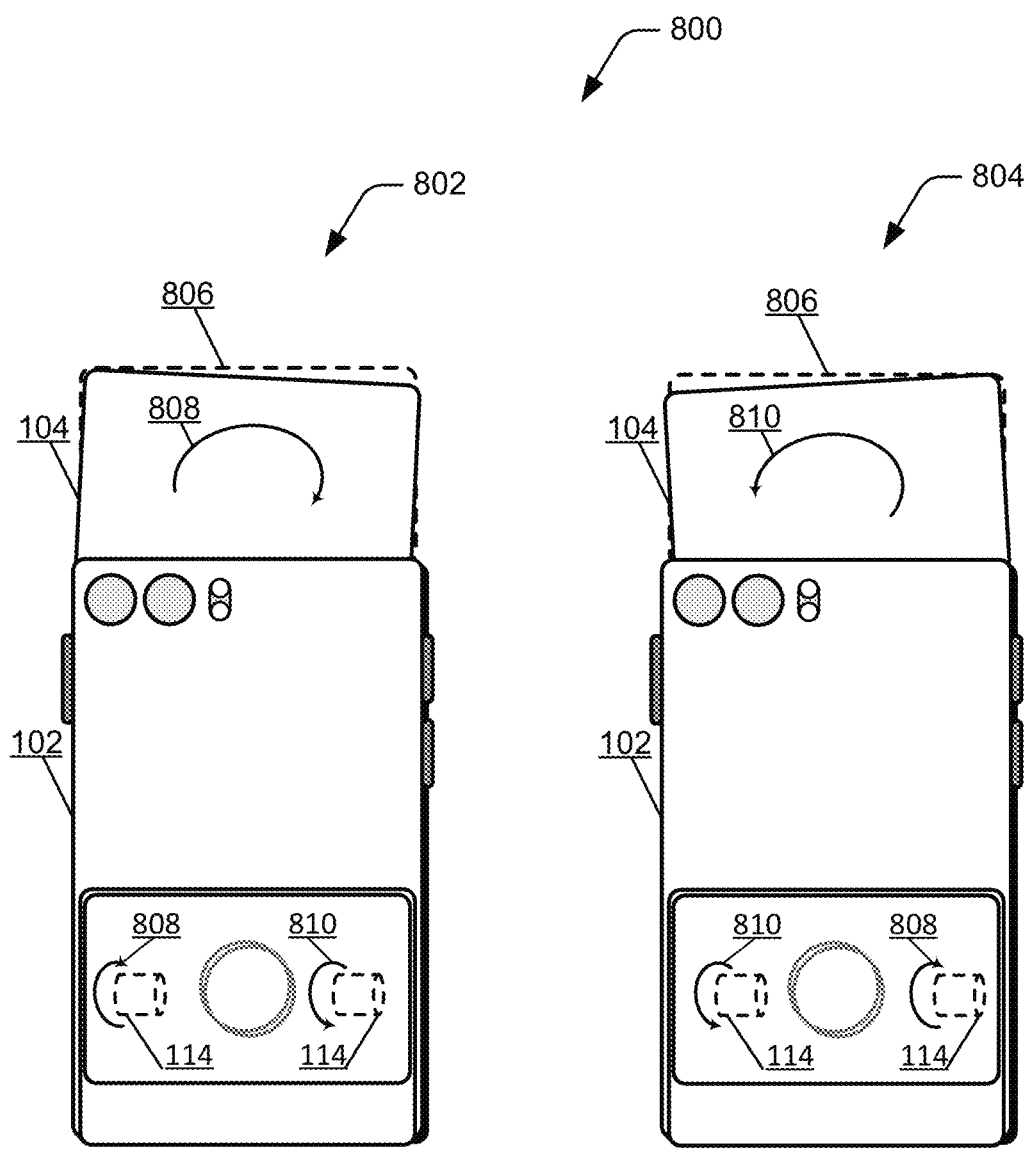
FIG. 8 illustrates an example of mobile device expansion, which supports providing user feedback via a rollable screen device in accordance with one or more implementations as described herein.

FIG. 8 further illustrates example views 800 of a mobile device 102 in aspects of providing user feedback via a rollable screen device, as described herein. The example views 800 may implement aspects of the example system 100, as well as any of the example views 200, 300, 400, 500, 600, and 700 as described with reference to FIGS. 1 through 7. For example, the example views 800 may illustrate an example of the mobile device 102 with the rollable display screen 104 and components 114, which are examples of the corresponding features as described with reference to FIGS. 1 through 7.

In the example views 800, the mobile device 102 can initiate movement of an expanded portion of the rollable display screen 104, such as through a series of positions to provide feedback to a user. The positions can include a position 802 and a position 804. The mobile device 102 can receive a user input and select a series of movements in accordance with the user input. For example, if the user does not apply enough force to satisfy a threshold value, the configuration manager 116 of the mobile device 102 selects a set of movements to indicate to the user to apply more force. In some other examples, if the user applies a sufficient force to satisfy a threshold value, the configuration manager 116 of the mobile device 102 selects a set of movements to indicate to the user that the user input is received. In some other examples, if the user applies sufficient force to satisfy a threshold value related to damaging the mobile device 102 (e.g., relatively too much force), the configured for, 116 selects a set of movements to indicate to the user that the user input is received and to reduce the force applied. In addition to, or as an alternative to, selecting a set of movements, the mobile device 102 can select visual, audio, and/or tactile feedback to indicate to the user to apply more force, the user input is received, and/or the force is too high.

In some examples, for the position 802, the mobile device 102 can initiate movement of the rollable display screen 104 from an expanded state 806 in a right rotational direction 808 by concurrently, or simultaneously, activating components 114 of the mobile device 102 to rotate in different rotational directions. For example, the configuration manager 116 of the mobile device 102 can initiate activation, or drive, an actuator to rotate in the right rotational direction 808 and another actuator of the mobile device 102 to rotate in a left rotational direction 810. In some other examples, for the position 804, the configuration manager 116 of the mobile device 102 can move the rollable display screen 104 from the expanded state 806 in the left rotational direction 810 by concurrently, or simultaneously, activating components 114 of the mobile device 102 to rotate in different rotational directions. For example, the configuration manager 116 of the mobile device 102 can initiate activation of an actuator to rotate in the right rotational direction 808 and another actuator of the mobile device 102 to rotate in a left rotational direction 810.

In some examples, the mobile device 102 initiates movement of the rollable display screen 104 from the expanded state 806 to the position 802, from the position 802 to the position 804, and from the position 804 to the expanded state 806 to simulate a wiggle effect. The configuration manager 116 of the mobile device 102 can also combine one or more different effects to indicate feedback to the user. For example, the mobile device 102 can simulate a button press effect, as described with reference to FIG. 7, if the user applies sufficient force to provide user input and can perform a wiggle effect if the user does not apply sufficient force when compared with a threshold force value for providing user input, among other examples.

Example methods 900, 1000, and 1100 are described with reference to respective FIGS. 9 through 11 in accordance with one or more implementations for providing user feedback via a rollable screen device, as described herein. Generally, any services, components, modules, managers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
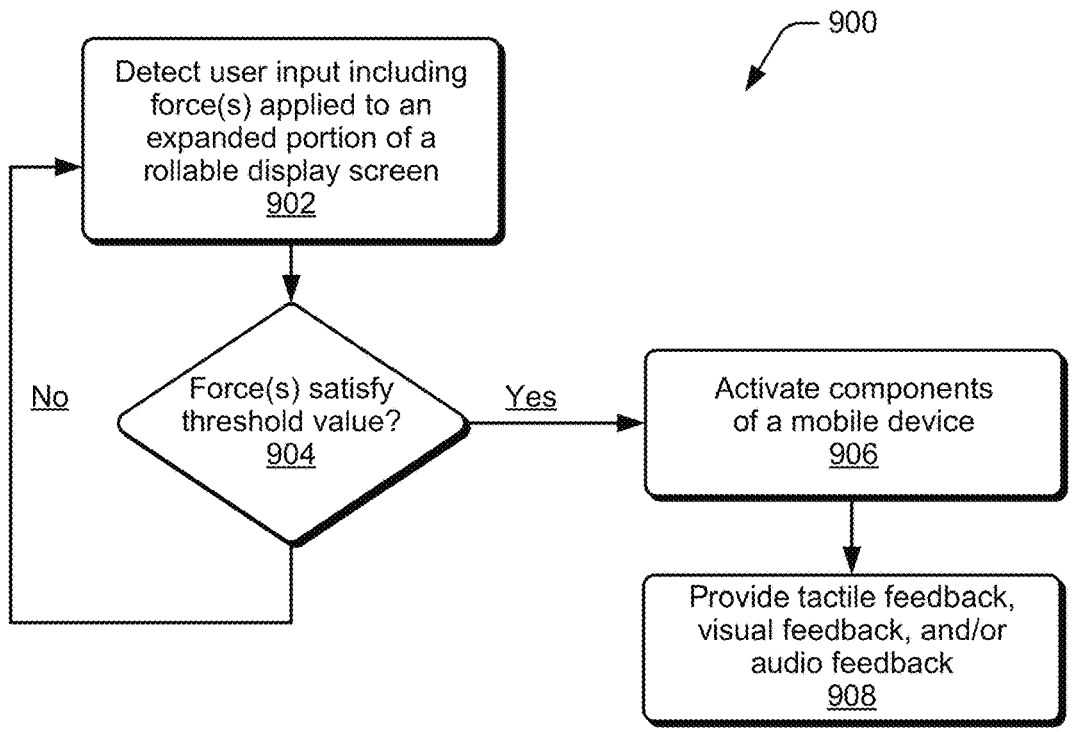
FIGS. 9-11 illustrate example methods for providing user feedback via a rollable screen device in accordance with one or more implementations of the techniques described herein.

FIG. 9 illustrates one or more example methods 900 for providing user feedback via a rollable screen device. The order in which the method is described is not intended to be construed as a limitation, and any number or combination of the described method operations can be performed in any order to perform a method, or an alternate method.

At 902, user input including forces applied to an expanded portion of a rollable display screen of a mobile device is detected. For example, the configuration manager 116 can receive measurements from one or more sensors to detect forces applied to the expanded portion of the rollable screen 104 of the mobile device 102. The configuration manager 116 determines the user input from the received measurements.

At 904, a determination is made as to whether the forces satisfy a threshold value. The threshold value can depend on whether the force is sufficient to provide user input, whether the force exceeds a value that may damage the mobile device, or the like. The configuration manager 116 determines the threshold value and compares the forces to the threshold value. If the forces are greater than or equal to (e.g., exceed) a threshold value that corresponds to whether the force is sufficient to provide the user input, then the force satisfies the threshold value (e.g., "Yes" from 904). If the forces are less than (e.g., do not exceed) the threshold value that corresponds to whether the force is sufficient to provide the user input, then the force fails to satisfy the threshold value (e.g., "No" from 904). Similarly, if the forces are greater than or equal to a threshold value that corresponds to whether the force exceeds a value that damages the mobile device, then the force satisfies the threshold value, which also corresponds to the output of "Yes" from 904.

At 906, if the forces satisfy the threshold value, then one or more components (e.g., actuators, piezoelectric sensors, or any other component) of the mobile device are activated to provide feedback to the user related to receiving the user input. In other examples, if the forces fail to satisfy the threshold value, the one or more sensors 122 of the mobile device 102 detect additional user input. Additionally, or alternatively, the configuration manager 116 of the mobile device 102 activates one or more components of the mobile device to provide feedback to the user, such as an indication that the force is insufficient to recognize or detect as a user input.

At 908, tactile feedback, visual feedback, and/or audio feedback is provided. For example, the configuration manager 116 of the mobile device 102 activates, or drives, one or more actuators and/or piezoelectric sensors to provide tactile feedback, activates a GUI of the mobile device 102 to display visual feedback, activates one or more sound emitters of the mobile device 102 to provide audio feedback, or any combination thereof. Activating the one or more actuators can include moving the expanded portion of the screen in accordance with one or more displacements from an initial expanded position, such as to simulate a button press, to simulate a wiggle effect (e.g., by simultaneously driving the actuators in different directions), or both.

Figure 10:
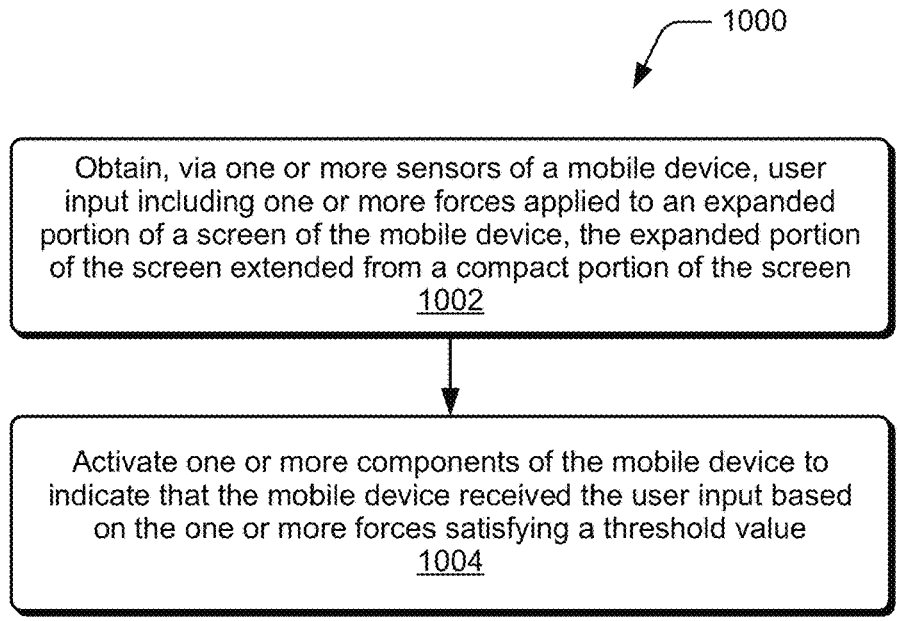

FIG. 10 illustrates one or more example methods 1000 for providing user feedback via a rollable screen device. The order in which the method is described is not intended to be construed as a limitation, and any number or combination of the described method operations can be performed in any order to perform a method, or an alternate method.

At 1002, user input is obtained via one or more sensors of a mobile device, the user input including one or more forces applied to an expanded portion of a screen of the mobile device, and the expanded portion of the screen extended from a compact portion of the screen. For example, the configuration manager 116 receives user input detected by one or more force sensors and/or motion sensors.

At 1004, one or more components of the mobile device are activated to indicate that the mobile device received the user input based on the one or more forces satisfying a threshold value. For example, the configuration manager 116 of the mobile device 102 determines that a force applied by user input satisfies a threshold value and activates the components 114 to acknowledge the user input, to communicate a message to the user, or the like.

Figure 11:
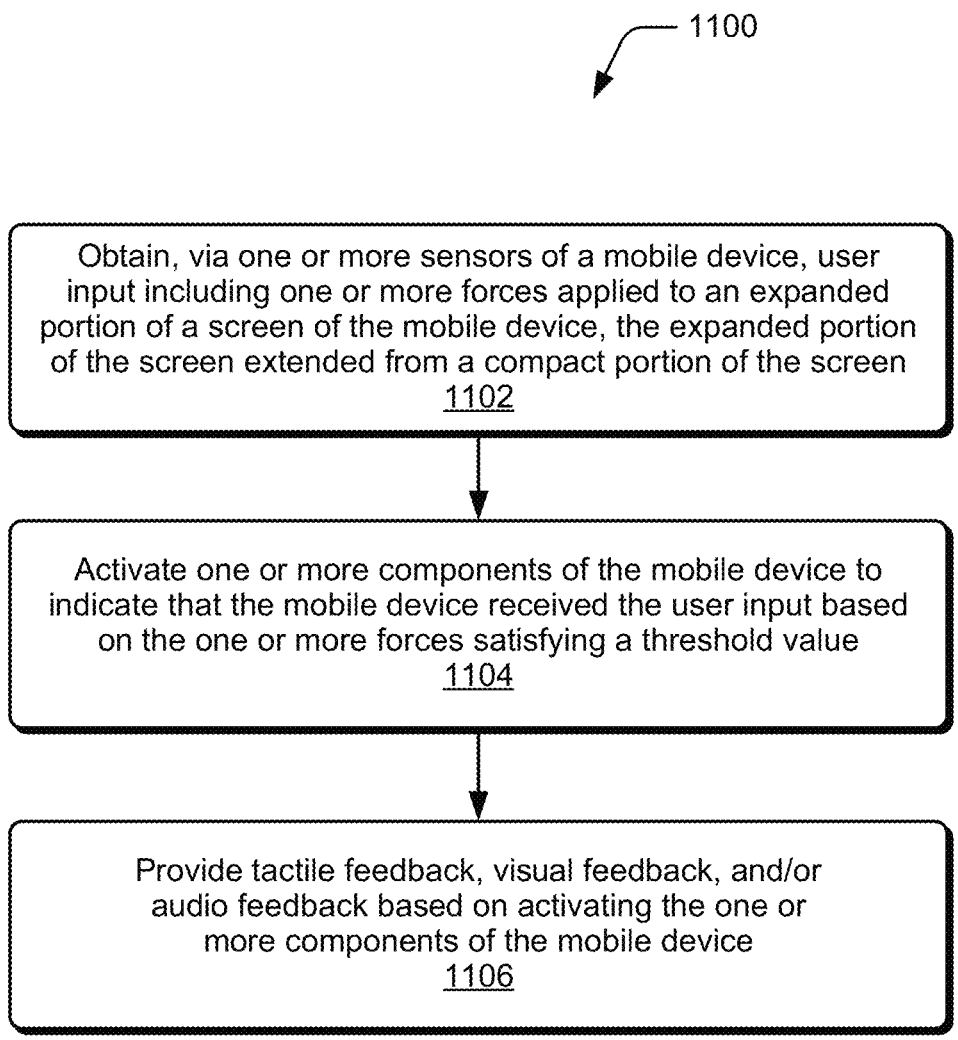

FIG. 11 illustrates one or more example methods 1100 for providing user feedback via a rollable screen device. The order in which the method is described is not intended to be construed as a limitation, and any number or combination of the described method operations can be performed in any order to perform a method, or an alternate method.

At 1102, user input is obtained via one or more sensors of a mobile device, the user input including one or more forces applied to an expanded portion of a screen of the mobile device, and the expanded portion of the screen extended from a compact portion of the screen. For example, the configuration manager 116 receives the user input detected using one or more force sensors and/or motion sensors.

At 1104, one or more components of the mobile device are activated to indicate that the mobile device received the user input based on the one or more forces satisfying a threshold value. For example, the configuration manager 116 of the mobile device 102 determines that a force applied by user input satisfies a threshold value and activates the components 114 to acknowledge the user input, to communicate a message to the user, or the like.

At 1106, tactile feedback, visual feedback, and/or audio feedback is provided based on activating the one or more components of the mobile device. For example, the configuration manager 116 of the mobile device 102 activates one or more actuators and/or piezoelectric sensors to provide tactile feedback, activate a GUI of the mobile device 102 to display visual feedback, activates one or more sound emitters of the mobile device 102 to provide audio feedback, or any combination thereof.

Figure 12:
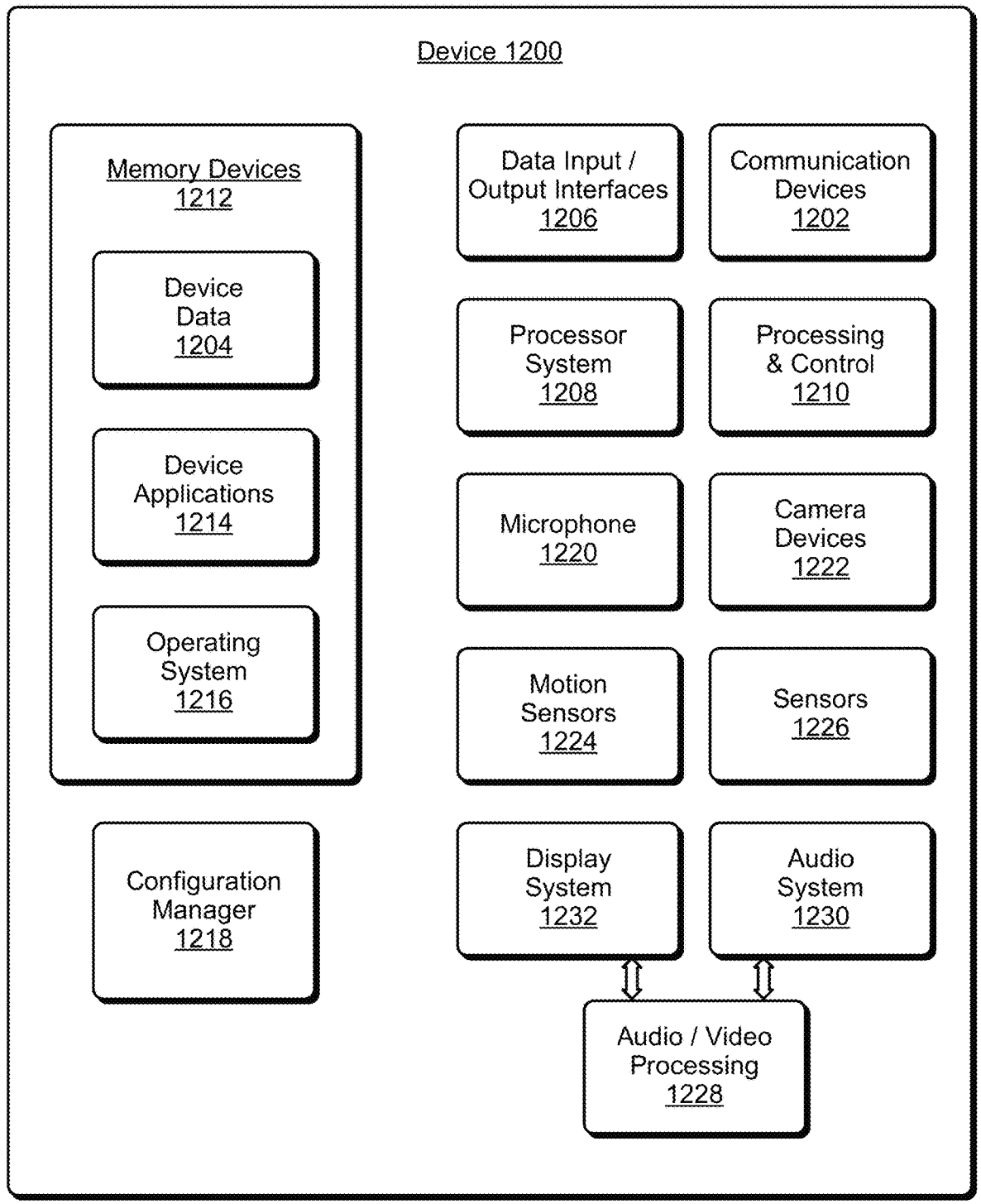
FIG. 12 illustrates various components of an example device that can be used to implement the techniques for providing user feedback via a rollable screen device as described herein.

FIG. 12 illustrates various components of an example device 1200, which can implement aspects of the techniques and features for providing user feedback via a rollable screen device, as described herein. The example device 1200 can be implemented as any of the devices described with reference to the previous FIGS. 1 through 11, such as any type of a wireless device, mobile device (e.g., the mobile device 102), mobile phone, flip phone, client device, companion device, paired device, display device, tablet, computing, communication, entertainment, gaming, media playback, and/or any other type of computing and/or electronic device. For example, the mobile device 102 described with reference to FIGS. 1 through 11 may be implemented as the example device 1200.

The example device 1200 can include various, different communication devices 1202 that enable wired and/or wireless communication of device data 1204 with other devices. The device data 1204 can include any of the various device's data and content that is generated, processed, determined, received, stored, and/or communicated from one computing device to another. Generally, the device data 1204 can include any form of audio, video, image, graphics, and/or electronic data that is generated by applications executing on a device. The communication devices 1202 can also include transceivers for cellular phone communication and/or for any type of network data communication.

The example device 1200 can also include various, different types of data input/output (I/O) interfaces 1206, such as data network interfaces that provide connection and/or communication links between the devices, data networks, and other devices. The I/O interfaces 1206 can be used to couple the device to any type of components, peripherals, and/or accessory devices, such as a computer input device that may be integrated with the example device 1200. The I/O interfaces 1206 may also include data input ports via which any type of data, information, media content, communications, messages, and/or inputs can be received, such as user inputs to the device, as well as any type of audio, video, image, graphics, and/or electronic data received from any content and/or data source.

The example device 1200 includes a processor system 1208 of one or more processors (e.g., any of microprocessors, controllers, and the like) and/or a processor and memory system implemented as a system-on-chip (SoC) that processes computer-executable instructions. The processor system 1208 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that may be implemented in connection with processing and control circuits, which are generally identified at 1210. The example device 1200 may also include any type of a system bus or other data and command transfer system that couples the various components within the device. A system bus can include any one or combination of different bus structures and architectures, as well as control and data lines.

The example device 1200 also includes memory and/or memory devices 1212 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1212 include volatile memory and non-volatile memory, fixed and removable media devices, and any suitable memory device or electronic data storage that maintains data for computing device access. The memory devices 1212 can include various implementations of random-access memory (RAM), read-only memory (ROM), flash memory, and other types of storage media in various memory device configurations. The example device 1200 may also include a mass storage media device.

The memory devices 1212 (e.g., as computer-readable storage memory) provide data storage mechanisms, such as to store the device data 1204, other types of information and/or electronic data, and various device applications 1214 (e.g., software applications and/or modules). For example, an operating system 1216 can be maintained as software instructions with a memory device 1212 and executed by the processor system 1208 as a software application. The device applications 1214 may also include a device manager, such as any form of a control application, software application, signal-processing and control module, code that is specific to a particular device, a hardware abstraction layer for a particular device, and so on.

In this example, the device 1200 includes a configuration manager 1218 that implements various aspects of the described features and techniques described herein. The configuration manager 1218 can be implemented with hardware components and/or in software as one of the device applications 1214, such as when the example device 1200 is implemented as the mobile device 102 described with reference to FIGS. 1 through 11. An example of the configuration manager 1218 is the configuration manager 116 implemented in the mobile device 102, such as a software application and/or as hardware components in the wireless device. In implementations, the configuration manager 1218 may include independent processing, memory, and logic components as a computing and/or electronic device integrated with the example device 1200.

The example device 1200 can also include a microphone 1220 and/or camera devices 1222, as well as proximity and/or motion sensors 1224, such as may be implemented as components of an inertial measurement unit (IMU). The proximity and/or motion sensors 1224 can be implemented with various sensors, such as a gyroscope, an accelerometer, and/or other types of motion sensors to sense motion of the device. The motion sensors 1224 can generate sensor data vectors having three-dimensional parameters (e.g., rotational vectors in x, y, and z-axis coordinates) indicating location, position, acceleration, rotational speed, and/or orientation of the device. The example device 1200 can also include one or more power sources 1226, such as when the device is implemented as a wireless device and/or a mobile device 102. The power sources may include a charging and/or power system, and can be implemented as a flexible strip battery, a rechargeable battery, a charged super-capacitor, and/or any other type of active or passive power source.

The example device 1200 can also include an audio and/or video processing system 1228 that generates audio data for an audio system 1230 and/or generates display data for a display system 1232. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1200. Alternatively, the audio system and/or the display system are external, peripheral components to the example device.

Although implementations of providing user feedback via a rollable screen device have been described in language specific to features and/or methods, the appended claims are not necessarily limited to the specific features or methods described. Rather, the specific features and methods are disclosed as example implementations of providing user feedback via a rollable screen device, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a mobile device, including: a housing; a screen moveable relative to the housing such that the mobile device has a compact form factor and an expanded form factor; one or more sensors positioned relative to the screen for detecting user input including one or more forces applied to an expanded portion of the screen in the expanded form factor of the mobile device; and a configuration manager configured to activate one or more components of the mobile device to indicate that the mobile device received the user input based at least in part on the one or more forces satisfying a threshold value.

In some aspects, the techniques described herein relate to the above-described mobile device, including any one or combination of: to activate the one or more components of the mobile device, the configuration manager is configured to initiate moving the expanded portion of the screen in accordance with one or more displacements from an initial expanded position. At least one of a respective magnitude of each displacement of the one or more displacements or a numerical quantity of the one or more displacements correspond to instructions to a user of the mobile device. Moving the expanded portion of the screen simulates a button press. The one or more components include a first actuator and a second actuator; and to activate the one or more components of the mobile device, the configuration manager is configured to simultaneously drive the first actuator in a first direction and the second actuator in a second direction opposite from the first direction to move the expanded portion of the screen in accordance with a displacement from an initial expanded position. The configuration manager is configured to provide at least one of tactile feedback, visual feedback, or audio feedback based at least in part on activating the one or more components of the mobile device. The one or more sensors include at least one of one or more force sensors or one or more piezoelectric sensors. The one or more components of the mobile device include at least one of one or more actuators or one or more piezoelectric sensors.

In some aspects, the techniques described herein relate to a method, including: obtaining, via one or more sensors of a mobile device, user input including one or more forces applied to an expanded portion of a screen of the mobile device, the expanded portion of the screen extended from a compact portion of the screen; and activating one or more components of the mobile device to indicate that the mobile device received the user input based at least in part on the one or more forces satisfying a threshold value.

In some aspects, the techniques described herein relate to the above-described method, including any one or combination of: activating the one or more components of the mobile device includes moving the expanded portion of the screen in accordance with one or more displacements from an initial expanded position. At least one of a respective magnitude of each displacement of the one or more displacements or a numerical quantity of the one or more displacements correspond to instructions to a user of the mobile device. Moving the expanded portion of the screen simulates a button press. Simultaneously driving a first actuator in a first direction and a second actuator in a second direction opposite from the first direction to move the expanded portion of the screen in accordance with a displacement from an initial expanded position. The method further comprising providing at least one of tactile feedback, visual feedback, or audio feedback based at least in part on activating the one or more components of the mobile device. Activating the one or more components of the mobile device is in accordance with at least one of a numerical quantity of the one or more forces, a location of the one or more forces on the expanded portion of the screen, or a magnitude of the one or more forces. The one or more sensors include at least one of one or more force sensors or one or more piezoelectric sensors. The one or more components of the mobile device include at least one of one or more actuators or one or more piezoelectric sensors.

In some aspects, the techniques described herein relate to a system including: one or more actuators configured to move a screen to a position corresponding to a compact form factor of a mobile device or an expanded form factor of the mobile device; one or more sensors positioned relative to the screen for detecting user input including one or more forces applied to an expanded portion of the screen in the expanded form factor of the mobile device; and a configuration manager configured to activate one or more components of the mobile device to indicate that the mobile device received the user input based at least in part on the one or more forces satisfying a threshold value.

In some aspects, the techniques described herein relate to the above-described system, including any combination of: the configuration manager is configured to provide at least one of tactile feedback, visual feedback, or audio feedback based at least in part on activating the one or more components of the mobile device. The one or more sensors include at least one of one or more force sensors or one or more piezoelectric sensors.

The invention claimed is:

1. A mobile device, comprising:
a housing;
a screen moveable relative to the housing such that the mobile device has a compact form factor and an expanded form factor;
one or more sensors positioned relative to the screen for detecting user input including one or more forces applied to an expanded portion of the screen in the expanded form factor of the mobile device; and
a configuration manager configured to activate one or more components of the mobile device to indicate that the mobile device received the user input based at least in part on the one or more forces satisfying a threshold value, wherein:
the one or more components include a first actuator and a second actuator; and
to activate the one or more components of the mobile device, the configuration manager is configured to simultaneously drive the first actuator in a first direction and the second actuator in a second direction opposite from the first direction to move the expanded portion of the screen in accordance with a displacement from an initial expanded position.

2. The mobile device of claim 1, wherein to activate the one or more components of the mobile device, the configuration manager is configured to initiate moving the expanded portion of the screen in accordance with one or more displacements from the initial expanded position.

3. The mobile device of claim 2, wherein at least one of a respective magnitude of each displacement of the one or more displacements or a numerical quantity of the one or more displacements correspond to instructions to a user of the mobile device.

4. The mobile device of claim 2, wherein moving the expanded portion of the screen simulates a button press.

5. The mobile device of claim 1, wherein the configuration manager is configured to provide at least one of tactile feedback, visual feedback, or audio feedback based at least in part on activating the one or more components of the mobile device.

6. The mobile device of claim 1, wherein the one or more sensors include at least one of one or more force sensors or one or more piezoelectric sensors.

7. The mobile device of claim 1, wherein the one or more components of the mobile device include at least one of one or more actuators or one or more piezoelectric sensors.

8. A method, comprising:
obtaining, via one or more sensors of a mobile device, user input including one or more forces applied to an expanded portion of a screen of the mobile device, the expanded portion of the screen extended from a compact portion of the screen; and
activating one or more components of the mobile device to indicate that the mobile device received the user input based at least in part on the one or more forces satisfying a threshold value, wherein activating the one or more components of the mobile device comprises simultaneously driving a first actuator in a first direction and a second actuator in a second direction opposite from the first direction to move the expanded portion of the screen in accordance with a displacement from an initial expanded position.

9. The method of claim 8, wherein activating the one or more components of the mobile device comprises moving the expanded portion of the screen in accordance with one or more displacements from the initial expanded position.

10. The mobile device of claim 9, wherein at least one of a respective magnitude of each displacement of the one or more displacements or a numerical quantity of the one or more displacements correspond to instructions to a user of the mobile device.

11. The mobile device of claim 9, wherein moving the expanded portion of the screen simulates a button press.

12. The method of claim 8, further comprising providing at least one of tactile feedback, visual feedback, or audio feedback based at least in part on activating the one or more components of the mobile device.

13. The method of claim 8, wherein activating the one or more components of the mobile device is in accordance with at least one of a numerical quantity of the one or more forces, a location of the one or more forces on the expanded portion of the screen, or a magnitude of the one or more forces.

14. The method of claim 8, wherein the one or more sensors include at least one of one or more force sensors or one or more piezoelectric sensors.

15. The method of claim 8, wherein the one or more components of the mobile device include at least one of one or more actuators or one or more piezoelectric sensors.

16. A system comprising:
one or more actuators configured to move a screen to a position corresponding to a compact form factor of a mobile device or an expanded form factor of the mobile device;
one or more sensors positioned relative to the screen for detecting user input including one or more forces applied to an expanded portion of the screen in the expanded form factor of the mobile device; and
a configuration manager configured to activate one or more components of the mobile device to indicate that the mobile device received the user input based at least in part on the one or more forces satisfying a threshold value, wherein:
the one or more components include a first actuator and a second actuator; and
to activate the one or more components of the mobile device, the configuration manager is configured to simultaneously drive the first actuator in a first direction and the second actuator in a second direction opposite from the first direction to move the expanded portion of the screen in accordance with a displacement from an initial expanded position.

17. The system of claim 16, wherein the configuration manager is configured to provide at least one of tactile feedback, visual feedback, or audio feedback based at least in part on activating the one or more components of the mobile device.

18. The system of claim 16, wherein the one or more sensors include at least one of one or more force sensors or one or more piezoelectric sensors.

19. The system of claim 16, wherein to activate the one or more components of the mobile device, the configuration manager is configured to initiate moving the expanded portion of the screen in accordance with one or more displacements from the initial expanded position.

20. The system of claim 19, wherein at least one of a respective magnitude of each displacement of the one or more displacements or a numerical quantity of the one or more displacements correspond to instructions to a user of the mobile device.

\* \* \* \* \*